United States Patent
Gilbert

[19]

[11] Patent Number: 5,836,290
[45] Date of Patent: Nov. 17, 1998

[54] APPARATUS AND METHOD FOR GASIFYING VOLATILE LIQUID FUELS

[75] Inventor: Jack J. Gilbert, Alphretta, Ga.

[73] Assignee: The Gasifier Corporation, Shelby Township, Mich.

[21] Appl. No.: 594,684

[22] Filed: Jan. 29, 1996

Related U.S. Application Data

[63] Continuation of Ser. No. 506,322, Jul. 24, 1995, abandoned.

[51] Int. Cl.$^6$ .................................................. F02M 17/02
[52] U.S. Cl. .......................................... 123/522; 123/1 A
[58] Field of Search ................................... 123/522, 1 A, 123/3; 261/DIG. 83

[56] References Cited

U.S. PATENT DOCUMENTS

| | | |
|---|---|---|
| 349,211 | 9/1886 | Cottrell . |
| 527,639 | 10/1894 | Westcott . |
| 1,180,389 | 4/1916 | Friend . |
| 1,598,243 | 8/1926 | Chapin . |
| 1,883,142 | 10/1932 | Wannack . |
| 1,889,162 | 11/1932 | Thomas et al. . |
| 2,351,072 | 6/1944 | Schmidt . |
| 2,565,767 | 8/1951 | Gaskell, Jr. . |
| 3,199,847 | 8/1965 | Wahnish ..................................... 261/35 |
| 3,325,152 | 6/1967 | Wahnish ..................................... 261/46 |
| 3,338,223 | 8/1967 | Williams . |
| 3,986,846 | 10/1976 | Bivins, Jr. ................................ 261/161 |
| 4,011,847 | 3/1977 | Fortino ..................................... 123/134 |
| 4,149,853 | 4/1979 | DesMarais, Jr. et al. .................. 44/50 |
| 4,270,505 | 6/1981 | Johnson .................................. 123/522 |
| 4,271,098 | 6/1981 | Henning et al. ........................... 261/66 |
| 4,399,079 | 8/1983 | Lowe ......................................... 261/55 |
| 4,551,153 | 11/1985 | Won .......................................... 261/91 |
| 5,004,571 | 4/1991 | Litz et al. ................................. 261/91 |
| 5,108,662 | 4/1992 | Litz et al. ................................. 261/16 |
| 5,168,836 | 12/1992 | Kraus .................................... 123/25 F |

*Primary Examiner*—David A. Okonsky
*Attorney, Agent, or Firm*—Brooks & Kushman P.C.

[57] ABSTRACT

A fuel system (10,10') including apparatus (12) for gasifying volatile liquid fuels by introducing dried air and a volatile liquid fuel into a round mixing chamber (46) for circular flow and mixing. Liquid fuel that flows downwardly to a lower extremity (48) of the mixing chamber is removed through a liquid outlet (56). A gas mixture of air and fuel at an upper extremity (50) of the mixing chamber is delivered through a gas outlet (60) for combustion by an internal combustion engine.

26 Claims, 4 Drawing Sheets

5,836,290

APPARATUS AND METHOD FOR GASIFYING VOLATILE LIQUID FUELS

This is a continuation of application Ser. No. 08/506,322 filed on Jul. 24, 1995 now abandoned.

TECHNICAL FIELD

This invention relates to apparatus and a method for gasifying volatile liquid fuels for combustion and also relates to a fuel system that includes the gasifying apparatus for performing the method.

BACKGROUND ART

U.S. Pat. No. 4,426,984 Gilbert discloses apparatus for gasifying a volatile liquid fuel such as gasoline, methanol and the like for combustion by an internal combustion engine.

Other fuel carburetors and delivery systems for fuel are disclosed by United States Patents: U.S. Pat. Nos. 349,211 Cottrell; 527,639 Westcott; 1,180,389 Friend; 1,598,243 Chapin; 1,883,142 Wannack; 1,889,162 Thomas et al; 2,351,072 Schmidt; 2,565,767 Gaskell, Jr.; 3,338,223 Williams; 3,986,846 Bivins, Jr.; 4,149,853 DesMarais, Jr. et al; 4,270,505 Johnson; and 4,271,098 Henning et al.

DISCLOSURE OF INVENTION

One object of the present invention is to provide improved apparatus for gasifying volatile liquid fuels for combustion.

In carrying out the above object, the apparatus for gasifying volatile liquid fuels for combustion includes a housing having a generally round mixing chamber including lower and upper extremities. A housing inlet allows for the introduction of dried air and a volatile liquid fuel into the mixing chamber for circular flow for mixing with each other. A liquid outlet in the housing at the lower extremity of the mixing chamber allows for removal of liquid fuel that flows downwardly from the mixing circular flow of the air and the fuel. A gas outlet of the housing is located at the upper extremity of the mixing chamber for delivery of a gas mixture of air and fuel that is delivered for combustion.

In its preferred construction, the housing includes a round floor that defines the lower extremity of the mixing chamber and has a central location at which the liquid outlet is located and toward which the floor is inclined downwardly for gravity flow of the liquid fuel to the outlet. This floor of the housing preferably has a central sump at which the liquid outlet is located. Also, a pump of the apparatus is preferably provided for pumping the liquid fuel from the liquid outlet of the housing.

The housing of the apparatus also preferably includes an air inlet member for introducing the air into the mixing chamber and the housing inlet also includes a fuel inlet member located within the air inlet member to introduce the volatile liquid fuel into the mixing chamber with the air for mixing circular flow. As disclosed, the air inlet member is embodied by an elbow having a first portion supported by the housing and having a second portion that extends at about 90° to the first portion in the direction of the circular flow within the mixing chamber. The fuel inlet member is located within the housing supported first portion of the elbow.

Preferably, the gas outlet includes a collection chamber that receives the gas mixture of air and fuel from the mixing chamber for delivery for combustion. This gas outlet member includes a central vertically extending gas outlet member having a lower end that is communicated with the upper extremity of the mixing chamber and having an upper end that is communicated with the collection chamber. The vertically extending gas outlet member has a horizontal cross section of a smaller size than both the mixing chamber and the collection chamber. Also, the housing includes an upper wall defining the upper extremity of the mixing chamber, and the lower end of the vertically extending gas outlet member projects downwardly below the upper wall of the housing into the upper extremity of the mixing chamber. Furthermore, the gas outlet includes a gas delivery member supported by the housing centrally within the collection chamber and the gas outlet member.

The apparatus also includes a holder for a desiccant through which air is passed to provide the dried air fed to the housing inlet, as well as including a holder for a catalyst through which the volatile liquid fuel is passed prior to being fed to the housing inlet.

Another object of the present invention is to provide an improved method for gasifying volatile liquid fuels for combustion.

In carrying out the above object, the method for gasifying volatile fuels is performed by introducing dried air into a generally round mixing chamber having lower and upper extremities and by also introducing a volatile liquid fuel into the mixing chamber for circular flow and mixing with the air. Liquid fuel is removed from the lower extremity of the mixing chamber, and a gas mixture of air and fuel is removed from the upper extremity of the mixing chamber for combustion.

In the preferred practice of the method, the liquid fuel is introduced into the mixing chamber within the flow of dried air upon introduction thereof into the mixing chamber. Also, the liquid fuel is pumped from a sump at the lower extremity of the mixing chamber. Furthermore, a gas mixture of air and fuel is preferably fed to a collection chamber for delivery therefrom for combustion.

Another object is to provide an improved fuel system for an internal combustion engine.

In carrying out the above object, the fuel system includes a fuel tank for holding a volatile liquid fuel and a fuel supply pump for pumping the liquid fuel from the tank as well as including fuel gasifying apparatus which includes a housing having a generally round mixing chamber including lower and upper extremities. A holder for a desiccant through which air is passed to be dried is also provided. A housing inlet provides for introduction of the dried air and the liquid fuel into the mixing chamber for circular flow for mixing with each other. A liquid outlet in the housing at the lower extremity of the mixing chamber is also provided as is a fuel return pump for pumping liquid fuel that flows downwardly to the liquid outlet from the mixing circular flow of air and fuel back to the tank. A gas outlet of the housing is provided at the upper extremity of the mixing chamber through which a gas mixture of air and fuel is delivered to the engine for combustion.

In the preferred construction of the fuel system, the fuel gasifying apparatus has the more specific construction as discussed above.

Furthermore, two embodiments of the fuel system are disclosed. One embodiment of the fuel system additionally includes fuel injectors for supplying atomized liquid fuel to the internal combustion engine from the fuel tank as well as including a selector for supplying fuel from the tank to either the fuel gasifying apparatus or the fuel injectors. Another embodiment of the fuel system includes a carburetor for supplying fuel to the internal combustion engine from the fuel tank as well as including a selector for supplying fuel from the tank to either the fuel gasifying apparatus or the carburetor.

The objects, features and advantages of the present invention are readily apparent from the following detailed description of the best modes for carrying out the invention when taken in connection with the accompanying drawings.

BEST MODES FOR CARRYING OUT THE INVENTION

Figure 1:
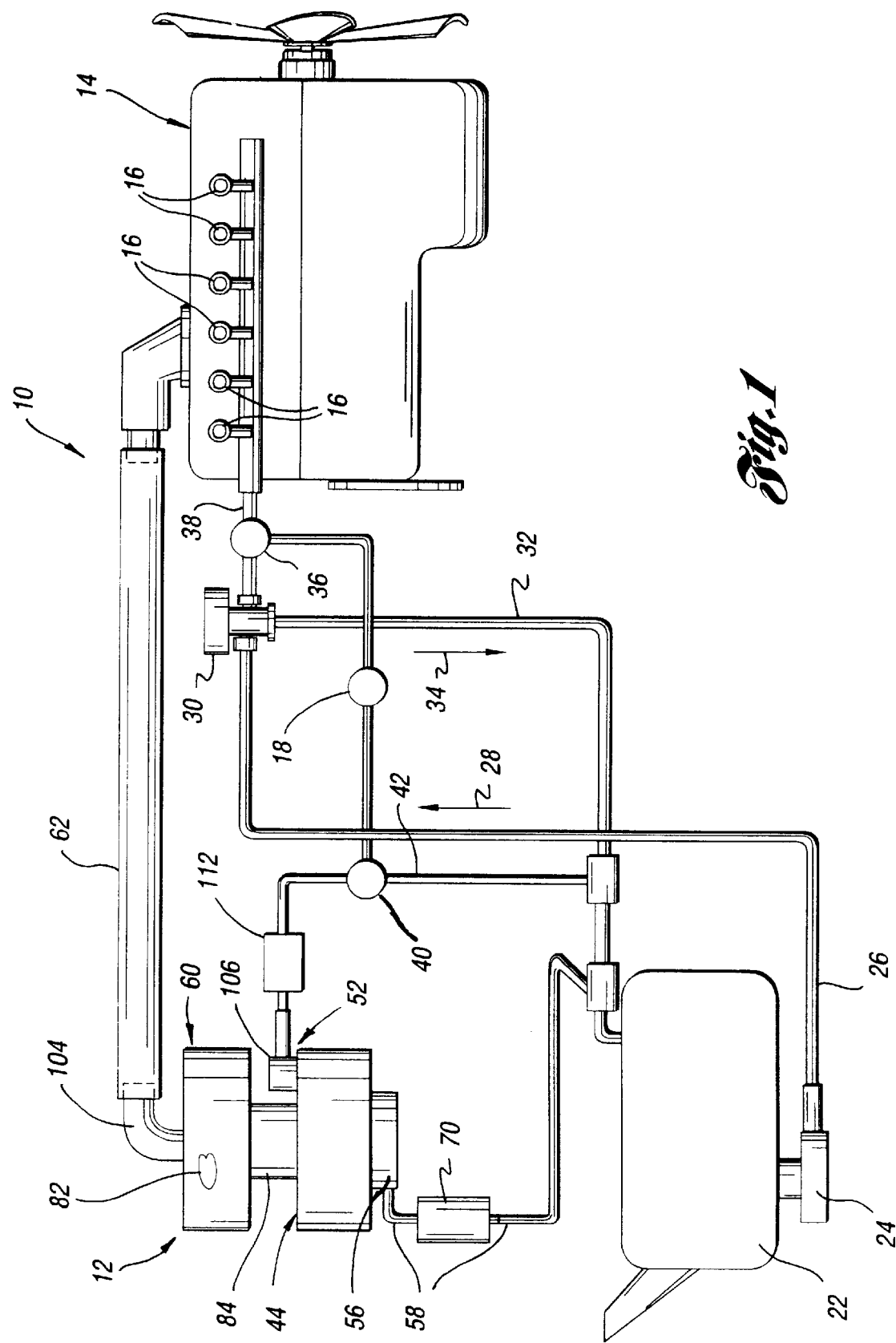
FIG. 1 is a somewhat schematic view of an internal combustion engine fuel system that is constructed in accordance with the present invention and includes fuel gasifying apparatus that is also constructed in accordance with the invention and performs a method thereof as part of the operation of the fuel system which also includes fuel injectors as an alternate way of delivering the fuel to the engine.

As illustrated in FIG. 1, a fuel system 10 constructed in accordance with the present invention includes liquid fuel gasifying apparatus 12 that is also constructed in accordance with the present invention and operable to perform the method thereof as is hereinafter more fully described. The fuel system 10, the fuel gasifying apparatus 12 and the method of the invention will be described in an integrated manner to facilitate an understanding of the different aspects of the invention.

Figure 5:
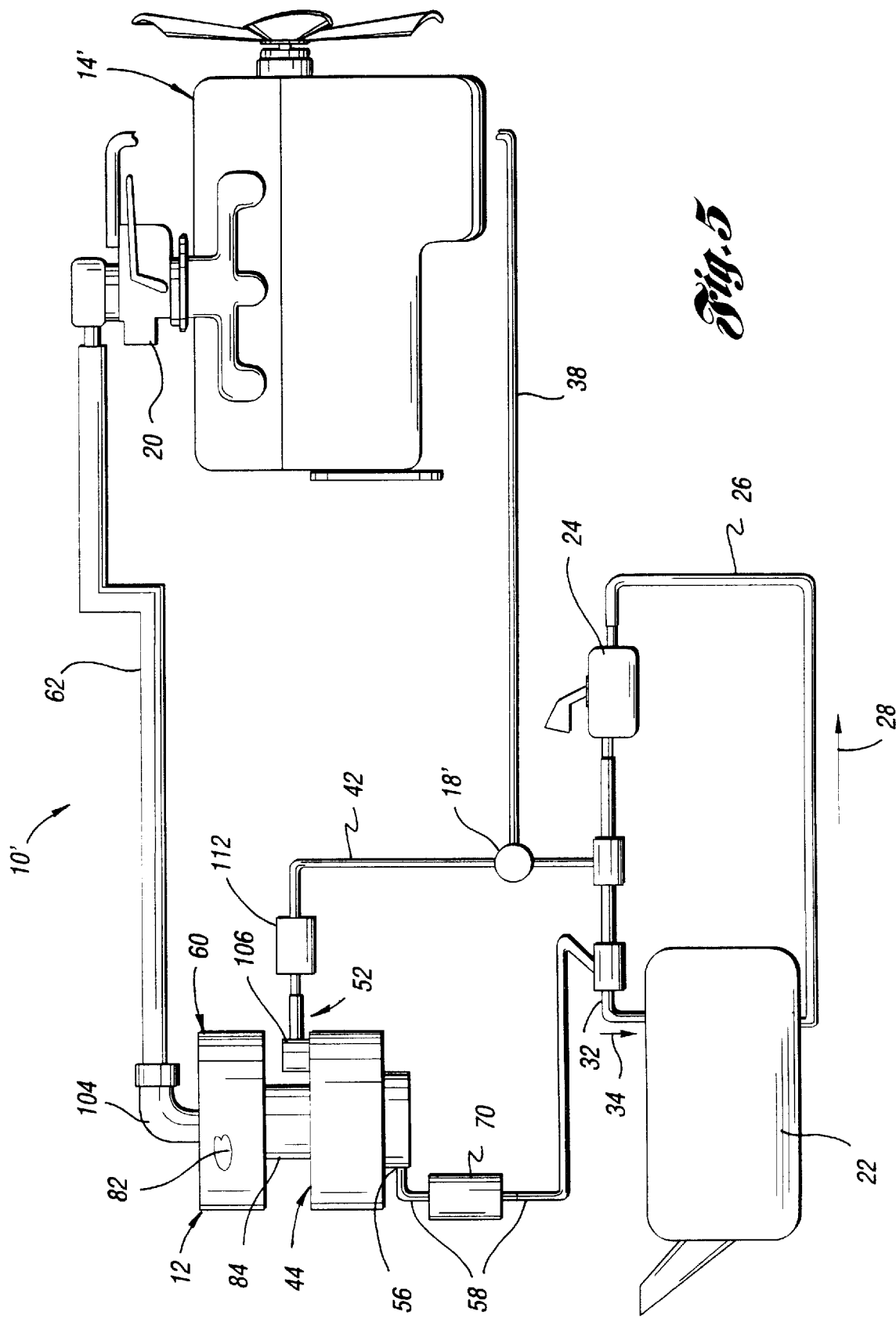
FIG. 5 is a schematic view of another engine fuel system that embodies the invention and utilizes the gasifying apparatus thereof but which is utilized with a vehicle carburetor as opposed to fuel injectors.

The fuel system 10 is illustrated in FIG. 1 as being utilized with an internal combustion engine 14 to provide a gas mixture of air and fuel thereto for combustion. Furthermore, the engine 14 with which the fuel system 10 is utilized is illustrated as having fuel injectors 16 for providing an alternate mode of fuel delivery to the engine under the control of a selector 18 as is hereinafter more fully described. In an alternate embodiment of the fuel system 10' as illustrated in FIG. 5, the engine 14' that is supplied a gas mixture of air and fuel is illustrated as including a carburetor 20 for providing an alternate mode of engine operation under the control of an associated selector 18' as is also hereinafter more fully described.

With continuing reference to FIG. 1, the fuel system 10 will be described before a more specific discussion of the fuel gasifying apparatus 12. This fuel system 10 includes a fuel tank 22 for holding a volatile liquid fuel that is combustible, such as gasoline, benzene, ethanol (i.e. ethyl alcohol), methanol (i.e. methyl alcohol), naphna, and mixtures thereof, etc. A fuel supply pump 24 pumps fuel from the tank 22 through a supply conduit 26 as shown by arrow 28 at a relatively high pressure of about 50–60 psi to a regulator valve 30. This regulator valve 30 reduces the pressure of the fuel to about 6 psi for flow back to the tank 22 through a return conduit 32 as shown by arrow 34. In addition, the regulator valve 30 under the control of the selector 18 and a valve 36 thereof supplies fuel at about 40 psi through a conduit 38 to the fuel injectors 16 in one mode of the operation, while another valve 40 of the selector then prevents liquid fuel flow to the gasifying apparatus 12. In the other mode of operation, the selector 18 closes the valve 36 while opening the valve 40 so that liquid fuel can flow from the low pressure return conduit 32 through a low pressure supply conduit 42 to the fuel gasifying apparatus 12.

Figure 2:
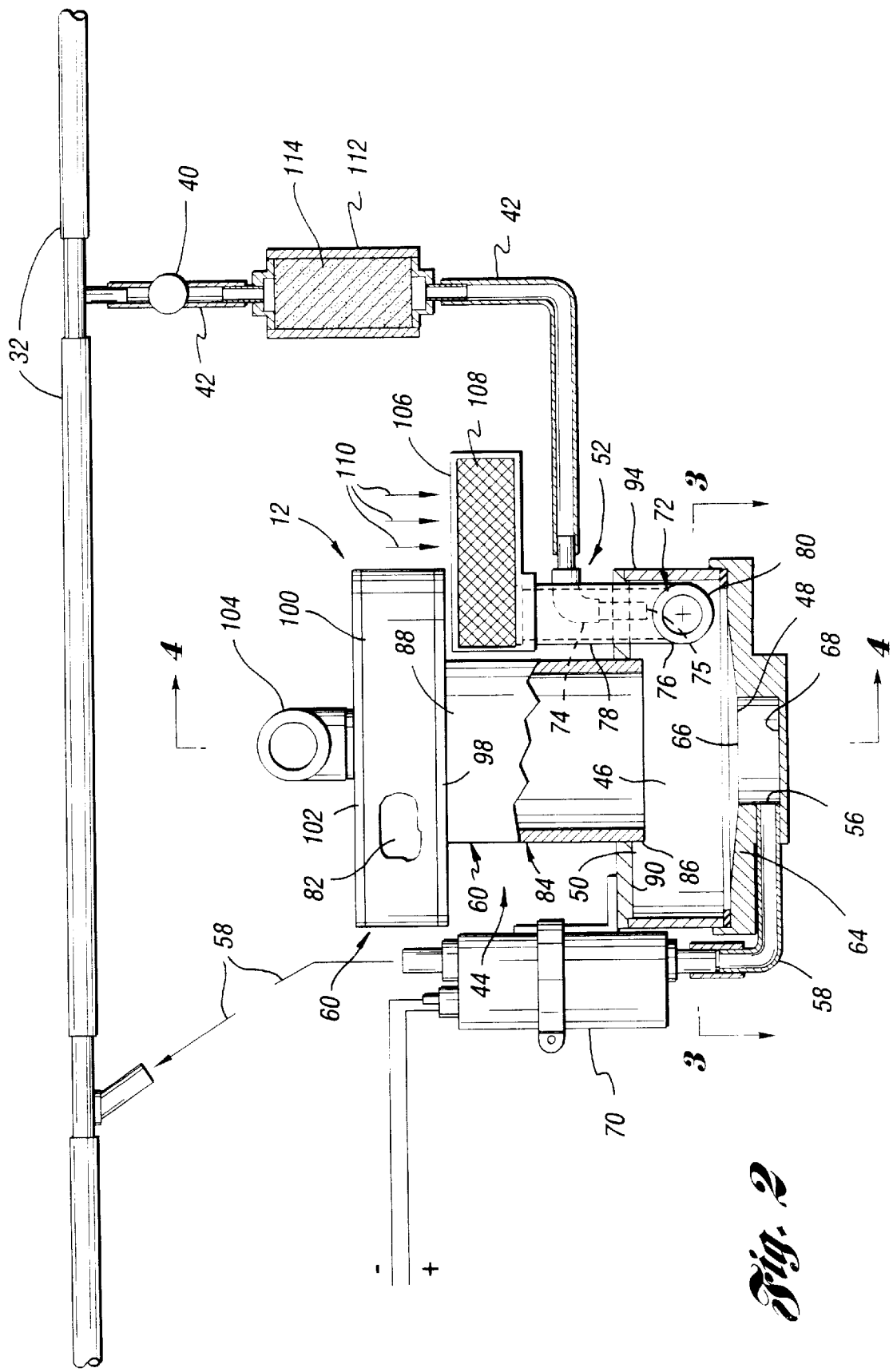
FIG. 2 is an elevational view taken partially in section of the fuel gasifying apparatus.
Figure 3:
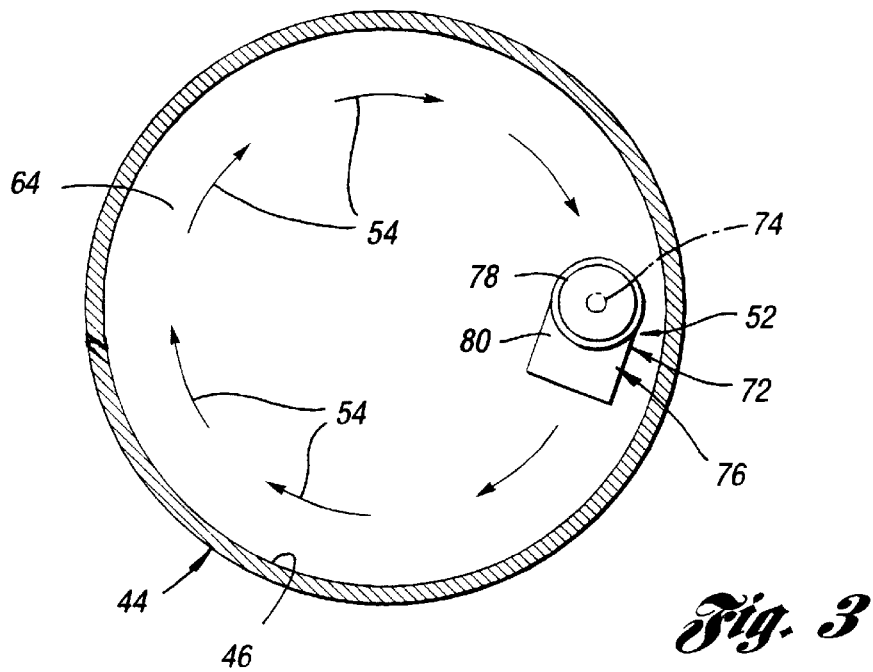
FIG. 3 is a sectional view taken along the direction of line 3—3 in FIG. 2 to illustrate a circular mixing flow of air and fuel within a mixing chamber of the apparatus.
Figure 4:
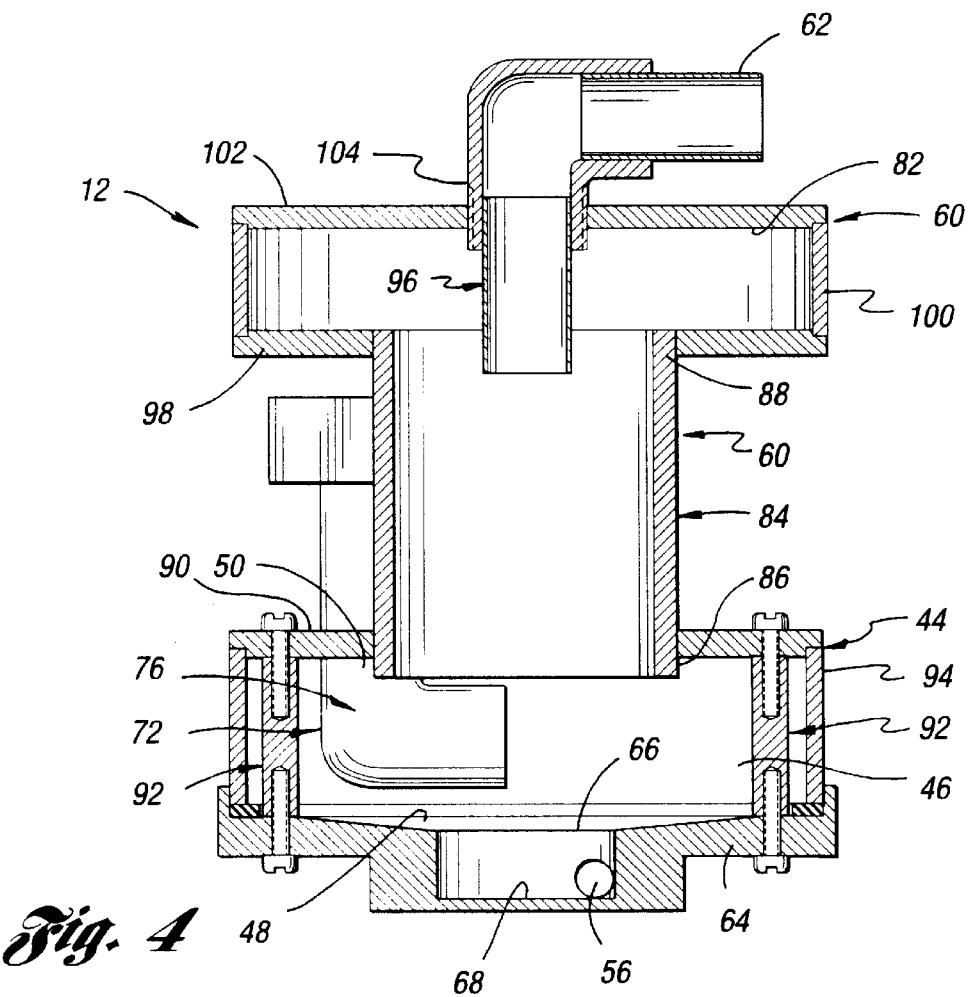
FIG. 4 is an elevational view taken in section along the direction of line 4—4 in FIG. 2 to further illustrate the construction of the fuel gasifying apparatus.

The fuel gasifying apparatus 12 as best illustrated in FIGS. 2–4 includes a housing 44 having a generally round mixing chamber 46 (FIG. 3) including lower and upper extremities 48 and 50, respectively. A housing inlet generally indicated by 52 provides for introduction for dried air and a volatile liquid fuel that has been passed through a catalyst into the mixing chamber for circular flow for mixing with each other as schematically indicated by arrows 54 in FIG. 3. As shown in both FIGS. 2 and 4, a liquid outlet 56 of the housing is provided at the lower extremity 48 of the mixing chamber to remove liquid fuel that flows downwardly from the mixing circular flow of the air and the fuel. This liquid fuel is returned from the liquid outlet 56 through a conduit 58 as shown in FIG. 1 to the low pressure fuel return conduit 32 at a location downstream from the location where the supply conduit 42 receives the liquid fuel for flow to the gasifying apparatus inlet 52. Housing 44 also includes a gas outlet 60 at the upper extremity 50 of the mixing chamber 46 to provide for a flow therethrough of a gas mixture of air and fuel that is delivered for combustion. More specifically, as illustrated in FIG. 1, this gas mixture of air and fuel is delivered from the gas outlet 60 through a conduit 62 to the engine 14 for combustion.

The manner in which the volatile liquid fuel is passed through a catalyst and mixed with dried air by the circular mixing flow while continuously removing liquid fuel from the lower extremity of the mixing chamber insures that there is a relatively high percentage of only the gas fuel mixed with the dried air and little if any liquid fuel droplets that are delivered from the gasifying apparatus to the engine for combustion.

In the preferred construction of the gasifying apparatus 12, the housing 44 includes a round floor 64 that defines the lower extremity 48 of the mixing chamber 46 as shown in FIG. 2. This mixing chamber floor 64 has a central location 66 at which the liquid outlet 56 is located and toward which the floor is inclined downwardly with a frustoconical shape for gravity flow of the liquid fuel to the outlet. More specifically, the floor 64 has a central sump 68 at which the liquid outlet 56 is located. Furthermore, a fuel return pump 70 shown in FIGS. 1 and 2 pumps the liquid fuel from the liquid outlet 56 through the conduit 58 previously described back to the low pressure return conduit 32 illustrated in FIG. 1 for flow back to the fuel tank 22.

As illustrated in FIGS. 2 and 3, the housing inlet 52 includes an air inlet member 72 for introducing the air into the mixing chamber 46 under the impetus of the engine vacuum. Furthermore, the housing inlet 52 also includes a fuel inlet member 74 for introducing the volatile liquid fuel into the mixing chamber 46 with the air for the mixing circular flow as previously described and illustrated by arrows 54 in FIG. 3. More specifically, the fuel inlet member has a lower nozzle opening 75 (FIG. 2) through which the liquid fuel is forced under pressure that generates a spray of small liquid droplets that form into a gas vapor upon the circular mixing flow with the dried air. Furthermore, the air inlet member 72 is illustrated as an elbow 76 having a first portion 78 supported in a suitable manner by the housing 44 and also having a second portion 80 that extends at about 90° to the first portion in the direction of the circular flow within the mixing chamber 46 as best illustrated in FIG. 3. Furthermore, the fuel inlet member 74 is located within the housing supported first portion 78 of the elbow 76.

As illustrated in FIGS. 1, 2 and 4, the gas outlet 60 of the gasifying apparatus 12 includes a collection chamber 82 that receives the gas mixture of air and fuel from the upper extremity of the mixing chamber for delivery under the impetus of the engine vacuum for combustion by the engine as previously described. Furthermore, the gas outlet 60 includes a central vertically extending gas outlet member 84 having a lower end 86 that is communicated as best shown in FIGS. 2 and 4 with the upper extremity 50 of the mixing chamber 46. An upper end 88 of the gas outlet member 84 is communicated with the collection chamber 82 as shown in FIG. 4. This vertically extending gas outlet member 84 has a horizontal cross section of a smaller size than both the mixing chamber 46 and the collection chamber 82.

As best illustrated in FIG. 4, the housing 44 of the fuel gasifying apparatus 12 is illustrated as including an upper wall 90 that defines the upper extremity 50 of the mixing chamber 46. Connectors 92 spaced circumferentially around the mixing chamber secure the upper wall 90 to the floor 64 as shown in FIG. 4 with an outer annular wall 94 therebetween so as to thereby provide the mixing chamber with its round shape. Furthermore, the lower end 86 of the vertically extending gas outlet member 84 projects downwardly below the upper wall 90 of the housing 44 into the upper extremity 50 of the mixing chamber 46. This construction prevents liquid fuel from migrating upwardly from the mixing chamber 46 along with the gas mixture of air and fuel to the collection chamber 82 for the delivery for combustion.

As best illustrated by continuing reference to FIG. 4, the gas outlet 60 also includes a gas delivery member 96 that is supported by the housing 44 centrally within the collection chamber 82 and the gas outlet member 84. More specifically, the gas outlet 60 includes an annular wall 98 whose inner extremity is supported by the upper end 88 of the gas outlet member 84 and whose outer extremity supports the lower end of a vertically extending annular wall 100 whose upper end supports a round upper wall 102. Any suitable type of securement connects the walls 98, 100 and 102 to each other. Furthermore, an elbow 104 is illustrated as being threaded into the upper wall 102 with the gas delivery member supported by one of its ends and with its other end connected to the conduit 62 that delivers the gas mixture of air and fuel to the internal combustion engine for combustion.

As illustrated in FIG. 2, the gasifying apparatus 12 also includes a holder 106 for a desiccant 108 through which air is passed as illustrated by arrows 110 for flow to the gas inlet 52 as previously described. The desiccant may consist of alumina or any other known equivalent. For instance, calcium carbonate ($CaCo_3$), calcium sulfate ($CaSO_4$), silica gel, or molecular sieves may also be used within filter 64 to remove moisture from incoming atmospheric air. The grain size of alumina may be between 3–100 microns, but it has been found that a size range of approximately 7–15 microns is the most effective in removing moisture from incoming atmospheric air. Furthermore, when operating within a vehicle engine compartment, it has been found that the heat present maintains the desiccant sufficiently dry so that it will continue to function in effectively removing moisture from the incoming air.

With continuing reference to FIG. 2, the gasifying apparatus 12 also includes a holder 112 for a catalyst 114 through which the volatile fuel is passed along the supply conduit 42 prior to being fed to the housing inlet 52. More specifically, it has been found that activated charcoal works well in catalyzing the fuel so as to prevent build-up of accumulations from the fuel in the gasifying apparatus between the inlet 52 and the outlets 56 and 60. Furthermore, the process for creating the activated charcoal is illustrated in the following example:

(a) Provide a quantity of approximately 20–40 grams of animal bone charcoal of six to eight mesh.

(b) Provide cupric chloride $CuCl_2 2(H_2O)$ crystals prepared in a solution of methanol with a ratio of 100 ml. methanol to about 50–170 grams of cupric chloride.

(c) Place the charcoal granules into an open vessel and pour the dissolved cupric chloride-methanol solution onto the charcoal. Permit saturation to take place for approximately 10 to 15 minutes.

(d) Remove the charcoal material from the solution and dry the charcoal in hot air to evaporate the methanol using a heat gun or other equivalent heating means so as to allow cupric chloride salt crystals to remain in the granules of animal bone charcoal.

(e) Place the activated charcoal material in a sealed container to prevent any moisture accumulation until ready for use.

It has been found that metallic salts work best in creating the activated charcoal. For instance, silver chloride and nickel chloride may also be used in step (b) of the example, but cupric chloride is preferred due to its low cost and effectiveness. Furthermore, it has been found that lower alkyl alcohols are most effective in dissolving the metallic salt and provide for an excellent alcohol-metallic salt solution which readily penetrates the animal bone charcoal substance in step (b) of the example. Examples of lower alkyl alcohols which may be used as alternatives to methanol in step (b) of the example are ethanol, propanol, butanol, pentanol, and hexanol.

It is believed that the catalyst ionizes the fuel in a manner that prevents the accumulation and build-up as discussed above. Other carbon catalysts or the like that function to prevent the accumulation or build-up within the gasifying apparatus can also be utilized.

With reference to FIG. 5, most of the previous description of FIGS. 1–4 regarding the fuel injected fuel system 10 is also applicable to the carburetor fuel system 10' and thus will not be repeated. However, the fuel supply pump 24 that pumps the fuel from the tank 22 through the conduit 26 only has a pressure of about 6 psi rather than the higher pressure needed for the fuel injected embodiment. Furthermore, the selector 18 is embodied by a selector valve that alternately supply the fuel to either the conduit 38 that supplies the carburetor 20 with fuel or to the conduit 42 that feeds the gasifying apparatus 12. Otherwise, the two fuel systems are the same and the gasifying apparatus 12 of each system has the same construction and method of operation described above.

While the best modes for carrying out the invention have been described in detail, those familiar with the art to which this invention relates will recognize various alternative designs and embodiments for practicing the invention as defined by the following claims.

What is claimed is:

1. Apparatus for gasifying volatile liquid fuels for combustion, comprising:

a housing having a generally round mixing chamber including lower and upper extremities;

a housing inlet for introducing dried air and a volatile liquid fuel into the mixing chamber for circular flow for mixing with each other;

a liquid outlet in the housing at the lower extremity of the mixing chamber for removing liquid fuel that flows downwardly from the mixing circular flow of the air and the fuel; and a gas outlet in the housing at the upper extremity of the mixing chamber and through which a gas mixture of air and fuel is delivered for combustion.

2. Apparatus as in claim 1 wherein the housing includes a round floor that defines the lower extremity of the mixing chamber and has a central location at which the liquid outlet is located and toward which the floor is inclined downwardly for gravity flow of the liquid fuel to the outlet.

3. Apparatus as in claim 2 wherein the floor of the housing has a central sump at which the liquid outlet is located.

4. Apparatus as in claim 1 further including a pump for pumping the liquid fuel from the liquid outlet of the housing.

5. Apparatus as in claim 1 wherein the housing inlet includes an air inlet member for introducing the air into the mixing chamber, and the housing inlet also including a fuel inlet member located within the air inlet member to introduce the volatile liquid fuel into the mixing chamber with the air for the mixing circular flow.

6. Apparatus as in claim 5 wherein the air inlet member comprises an elbow having a first portion supported by the housing and having a second portion that extends at about 90° to the first portion in the direction of the circular flow within the mixing chamber, and the fuel inlet member being located within the housing supported first portion of the elbow.

7. Apparatus as in claim 1 wherein the gas outlet includes a collection chamber that receives the gas mixture of the air and the fuel from the mixing chamber for delivery for combustion.

8. Apparatus as in claim 7 wherein the gas outlet includes a central vertically extending gas outlet member having a lower end that is communicated with the upper extremity of the mixing chamber and having an upper end that is communicated with the collection chamber, and the vertically extending gas outlet member having a horizontal cross section of a smaller size than both the mixing chamber and the collection chamber.

9. Apparatus as in claim 8 wherein the housing includes an upper wall defining the upper extremity of the mixing chamber, and the lower end of the vertically extending gas outlet member projecting downwardly below the upper wall of the housing into the upper extremity of the mixing chamber.

10. Apparatus as in claim 9 wherein the gas outlet includes a gas delivery member supported by the housing centrally within the collection chamber and the gas outlet member.

11. Apparatus as in claim 1 further including a holder for a desiccant through which air is passed to provide the dried air fed to the housing inlet.

12. Apparatus as in claim 1 further including a holder for a catalyst through which the volatile liquid fuel is passed prior to being fed to the housing inlet.

13. Apparatus as in claim 1 further including a holder for a desiccant through which air is passed to provide the dried air fed to the housing inlet, and a holder for a catalyst through which the volatile liquid fuel is passed prior to being fed to the housing inlet.

14. Apparatus for gasifying volatile liquid fuels for combustion, comprising:

a housing having a generally round mixing chamber including lower and upper extremities;

a housing inlet for introducing dried air and a volatile liquid fuel into the mixing chamber for circular flow for mixing with each other;

a liquid outlet in the housing at the lower extremity of the mixing chamber;

a pump for removing liquid fuel that flows downwardly to the liquid outlet from the mixing circular flow of the air and the fuel; and a gas outlet in the housing at the upper extremity of the mixing chamber through which a gas mixture of the air and fuel is delivered for combustion, and the gas outlet including a collection chamber that receives the gas mixture of air and fuel from the mixing chamber for the delivery for combustion.

15. Apparatus for gasifying volatile liquid fuels for combustion, comprising:

a housing having a generally round mixing chamber including a lower floor and an upper wall that respectively define lower and upper extremities of the mixing chamber;

a holder for a desiccant through which air is passed to be dried;

a housing inlet for introducing the dried air and a volatile liquid fuel into the mixing chamber for circular flow for mixing with each other;

a liquid outlet in the housing at the lower floor of the mixing chamber;

a pump for removing liquid fuel that flows downwardly to the liquid outlet from the mixing circular flow of the air and the fuel; and a gas outlet in the housing at the upper extremity of the mixing chamber through which a gas mixture of the air and the fuel is delivered for combustion, the gas outlet including a central vertically extending outlet member having lower and upper ends with the lower end thereof projecting downwardly below the upper wall of the mixing chamber, and the gas outlet including a collection chamber that receives the gas mixture of air and fuel from the mixing chamber through the vertically extending outlet member for the delivery for combustion.

16. A method for gasifying volatile liquid fuels, comprising:

introducing dried air into a generally round mixing chamber having lower and upper extremities;

introducing a volatile liquid fuel into the mixing chamber for circular flow and mixing with the air;

removing liquid fuel from the lower extremity of the mixing chamber; and removing a gas mixture of air and fuel from the upper extremity of the mixing chamber for combustion.

17. A method as in claim 16 wherein the liquid fuel is introduced into the mixing chamber within a flow of the dried air upon introduction thereof into the mixing chamber.

18. A method as in claim 16 wherein the liquid fuel is pumped from a sump at the lower extremity of the mixing chamber.

19. A method as in claim 16 wherein the gas mixture of air and fuel is fed to a collection chamber for delivery therefrom for combustion.

20. A method for gasifying volatile liquid fuels, comprising:

introducing dried air into a generally round mixing chamber having lower and upper extremities;

introducing a volatile liquid fuel into the mixing chamber for circular flow and mixing with the air;

pumping liquid fuel from the lower extremity of the mixing chamber;

passing a gas mixture of air and fuel from the upper extremity of the mixing chamber upwardly to a collection chamber; and delivering the gas mixture of air and fuel from the collection chamber for combustion.

21. A fuel system for an internal combustion engine, comprising:

a fuel tank for holding a volatile liquid fuel;

a fuel supply pump for pumping the liquid fuel from the tank; and fuel gasifying apparatus including a housing having a generally round mixing chamber including lower and upper extremities, a holder for a desiccant through which air is passed to be dried, a housing inlet for introducing the dried air and the liquid fuel into the mixing chamber for circular flow for mixing with each other, a liquid outlet in the housing at the lower extremity of the mixing chamber, a fuel return pump for pumping liquid fuel that flows downwardly to the liquid outlet from the mixing circular flow of air and fuel back to the tank, and a gas outlet in the housing at the upper extremity of the mixing chamber through which a gas mixture of air and fuel is delivered to the engine for combustion.

22. A fuel system as in claim 21 further including fuel injectors for supply atomized liquid fuel to the internal combustion engine from the fuel tank, and a selector for supplying fuel from the tank to either the fuel gasifying apparatus or the fuel injectors.

23. A fuel system as in claim 21 further including a carburetor for supplying fuel to the internal combustion engine from the fuel tank, and a selector for supplying fuel from the tank to either the fuel gasifying apparatus or the carburetor.

24. A fuel system for an internal combustion engine, comprising:

a fuel tank for holding a volatile liquid fuel;

a fuel supply pump for pumping the liquid fuel from the tank; and fuel gasifying apparatus including a housing having a generally round mixing chamber including a lower floor and an upper wall that respectively define lower and upper extremities of the mixing chamber, a holder for a desiccant through which air is passed to be dried, a housing inlet for introducing the dried air and the liquid fuel into the mixing chamber for circular flow for mixing with each other, a liquid outlet in the housing at the lower extremity of the mixing chamber, a fuel return pump for pumping liquid fuel that flows downwardly to the liquid outlet from the mixing circular flow of the air and fuel back to the tank, a gas outlet in the housing at the upper extremity of the mixing chamber to which a gas mixture of air and fuel is supplied from the circular flow of air and fuel in the mixing chamber, the gas outlet including a central vertically extending outlet member having lower and upper ends with the lower end thereof projecting downwardly below the upper wall of the mixing chamber, and the gas outlet including a collection chamber that receives the gas mixture of the air and fuel from the mixing chamber through the vertically extending outlet member for the delivery to the engine for combustion.

25. A fuel system as in claim 24 further including fuel injectors for supply atomized liquid fuel to the internal combustion engine from the fuel tank, and a selector for supplying fuel from the tank to either the fuel gasifying apparatus or the fuel injectors.

26. A fuel system as in claim 24 further including a carburetor for supplying fuel to the internal combustion engine from the fuel tank, and a selector for supplying fuel from the tank to either the fuel gasifying apparatus or the carburetor.

\* \* \* \* \*